US012621093B2

(12) United States Patent
Mu

(10) Patent No.: US 12,621,093 B2
(45) Date of Patent: May 5, 2026

(54) METHOD AND DEVICE FOR CONFIGURING FREQUENCY HOPPING, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 385 days.

(21) Appl. No.: 18/015,879

(22) PCT Filed: Aug. 13, 2020

(86) PCT No.: PCT/CN2020/109017
§ 371 (c)(1),
(2) Date: Jan. 12, 2023

(87) PCT Pub. No.: WO2022/032593
PCT Pub. Date: Feb. 17, 2022

(65) Prior Publication Data
US 2023/0275713 A1 Aug. 31, 2023

(51) Int. Cl.
*H04L 5/00* (2006.01)
*H04B 1/713* (2011.01)

(52) U.S. Cl.
CPC ........... *H04L 5/0042* (2013.01); *H04B 1/713* (2013.01); *H04L 5/0007* (2013.01)

(58) Field of Classification Search
CPC .............................. H04L 5/0042; H04B 1/713
See application file for complete search history.

(56) References Cited

U.S. PATENT DOCUMENTS

| | | | | |
|---|---|---|---|---|
| 11,943,774 B2 * | 3/2024 | Wong | .................... | H04L 5/0053 |
| 2012/0115526 A1 * | 5/2012 | Ogawa | .................... | H04B 1/713 |
| | | | | 455/509 |
| 2019/0028143 A1 * | 1/2019 | Zhang | .................... | H04B 1/7143 |
| 2019/0036665 A1 * | 1/2019 | Park | ..................... | H04L 5/0091 |
| 2020/0259521 A1 * | 8/2020 | Zhao | .................... | H04B 1/7136 |
| 2021/0274568 A1 * | 9/2021 | Sengupta | ............ | H04W 56/005 |

(Continued)

FOREIGN PATENT DOCUMENTS

| | | |
|---|---|---|
| CN | 101778475 A | 7/2010 |
| CN | 106605438 A | 4/2017 |

(Continued)

OTHER PUBLICATIONS

PCT/CN2020/109017 English translation of International Search Report dated Apr. 27, 2021, 2 pages.

(Continued)

*Primary Examiner* — Zhiren Qin
(74) *Attorney, Agent, or Firm* — Cozen O'Connor

(57) ABSTRACT

A method for configuring frequency hopping includes: determining a frequency-hopping related parameter; and transmitting data on at least one frequency band resource based on the frequency-hopping related parameter. At least two different transmission channels in a same frequency band may be based on a same or partially same frequency-hopping related parameter. Frequency-hopping related parameters may include a frequency hopping pattern or a frequency band switching time of a terminal.

17 Claims, 4 Drawing Sheets determining a frequency-hopping related parameter — S11 transmitting data on at least one frequency band resource based on the frequency-hopping related parameter — S12

(56)                    References Cited

U.S. PATENT DOCUMENTS

2021/0298054  A1 *    9/2021   Wong ..................... H04L 5/0091
2023/0171049  A1 *    6/2023   Tian ...................... H04W 16/14
                                                              370/329

FOREIGN PATENT DOCUMENTS

WO        WO 2016019552  A1     2/2016
WO        WO 2018171754  A1     9/2018
WO        WO-2019095223  A1 *   5/2019    ........ H04W 72/0453

OTHER PUBLICATIONS

Chinese Patent Application No. 202080001972.6, Office Action
with English translation dated Jun. 20, 2025, 15 pages.

* cited by examiner

PDSCH

UE BW

PDCCH a terminal
may only
receive one
due to a
limitation of
a terminal
capability network
device terminal terminal

METHOD AND DEVICE FOR CONFIGURING FREQUENCY HOPPING, AND STORAGE MEDIUM

CROSS-REFERENCE TO RELATED APPLICATION

The application is a national phase of International Application No. PCT/CN2020/109017, filed on Aug. 13, 2020, the entire content of which is incorporated herein by reference.

TECHNICAL FIELD

The disclosure relates to the field of wireless communication technologies, and particularly to, a method and a device for configuring frequency hopping, and a storage medium.

BACKGROUND

In communication technologies, a machine type communication (MTC) technology and a narrow band Internet of Things (NB-IoT) technology are provided for applications of IoT services such as low-rate, high-latency, or the like. In the related art, the MTC and NB-IoT technologies may not satisfy requirements of current IoT services with regard to the rate and the latency due to the ongoing development of the IoT services. Therefore, a new terminal such as a reduced capability user equipment (UE), simply referred to as an NR-lite, has been developed to cover requirements of the IoT services that require a faster rate of data transfer with reduced latency than that provided by current MTC and NB-IoT devices. A coverage enhancement means is adopted for a reduced capability problem of the terminal, and frequency-hopping transmission is further introduced.

SUMMARY

According to a first aspect of the disclosure, a method for configuring frequency hopping is provided. The method includes: determining a frequency-hopping related parameter; and transmitting data on at least one frequency band resource based on the frequency-hopping related parameter.

According to a second aspect of the disclosure, a device for configuring frequency hopping is provided. The device includes: a processor; and a memory configured to store instructions executable by the processor; in which the processor is configured to perform the method for configuring frequency hopping in the first aspect.

According to a third aspect of embodiments of the disclosure, a non-transitory computer readable storage medium is provided. When instructions in the storage medium are executed by a processor of a mobile terminal, the mobile terminal is caused to perform the method for configuring frequency hopping in the first aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
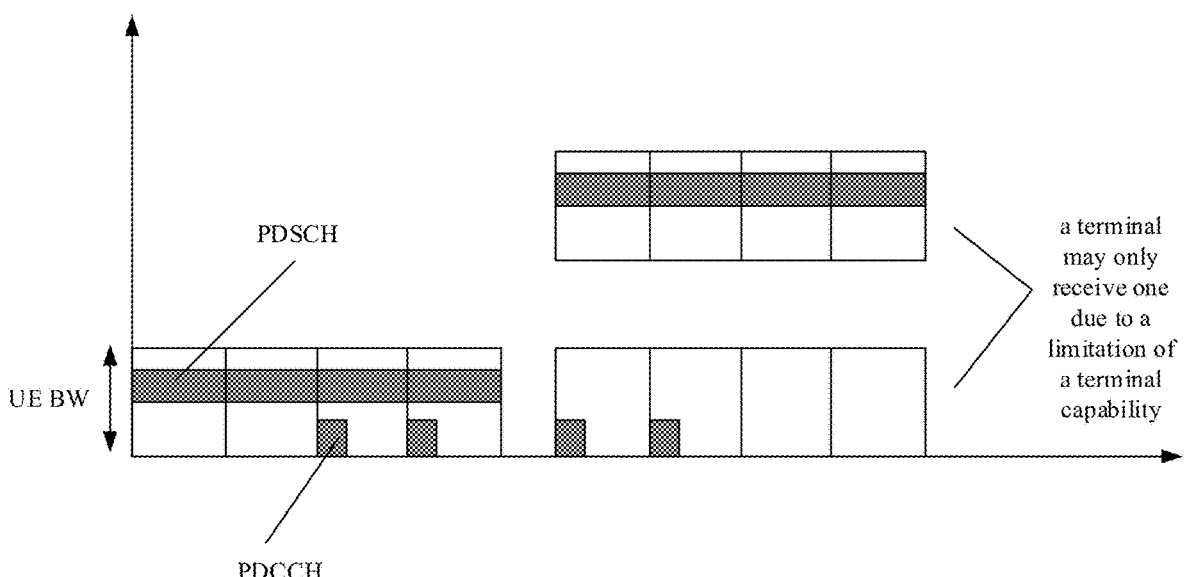
FIG. 1 is a diagram illustrating determining a frequency band position and a frequency switching time point in the related art.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

In a communication system, MTC and NB-IoT technologies are proposed in the related art for scenarios such as low-rate and high-latency applications (such as meter reading and environmental monitoring) in IoT services. At present, the NB-IoT technology may support a maximum rate of several hundred kilobytes and the MTC technology may support a maximum rate of several megabytes. However, with ongoing development of technology services (for example, monitoring, smart home, wearable devices, and industrial sensor detection, etc.), a rate of dozens to one hundred megabytes is generally required and a requirement for latency is also increased. Therefore, in the communication system, MTC and NB-IoT technologies have not satisfied requirements of the current IoT services. Therefore, a new user equipment (UE) is designed in a new radio (NR) communication system to cover a rate of dozens to one hundred megabytes and has a service requirement of a middle-end IoT device with a higher latency at the same time. At present, in 3rd Generation Partnership Project (3GPP) standardization, a UE that covers the rate of dozens to one hundred megabytes and has the service requirement of the middle-end IoT device with the higher latency is referred to as a reduced capability UE (referred to as a redcap terminal or an NR-lite).

At the same time, on the other hand, the NR-lite is generally required to satisfy requirements of low cost, low complexity, coverage enhancement to a certain degree, power saving, and the like. However, the NR communication technology is designed for a high-end terminal with a high rate and a low latency, which may not satisfy the above requirements of the NR-lite. Therefore, the current NR communication technology needs to be improved to satisfy the requirements of the NR-lite. For example, based on requirements of low cost and low complexity, a radio frequency (RF) bandwidth of the NR-IoT may be limited (for example, limited to 5 MHz or 10 MHz or a size of a buffer of the NR-lite is limited), and further a size of a transmission block received each time is limited, etc. For another example, a communication process may be simplified based on requirements of power saving, to reduce a number of times an NR-lite user detects a downlink control channel, etc.

However, since a capability of the redcap terminal is limited, a coverage capability of the redcap terminal may also be limited. In the related art, a coverage enhancement means is adopted, for example, retransmission (which refers to transmission of same content on time domains). Frequency-hopping transmission is further introduced on the basis of retransmission. In other words, retransmission of same information on different time domains may be performed on different frequency bands.

At present, the frequency switching time point is determined based on a current number of retransmissions of each transmission channel. However, for the redcap terminal, since there may be more than one transmission channel in one frequency band, the determined frequency band position and the frequency switching time point are different when the frequency switching time point is determined based on the current number of retransmissions of each transmission channel in the related art. FIG. 1 is a diagram illustrating determining a frequency band position and a frequency switching time point in the related art. In the related art, a physical downlink control channel (PDCCH) and a physical downlink shared channel (PDSCH) of a terminal may be transmitted two subframes apart. As illustrated in FIG. 1, in a same terminal channel (BW), the PDSCH starts frequency hopping at a fourth subframe, but the PDCCH starts frequency hopping in a sixth subframe. Therefore, when the frequency band position and the frequency switching time point are determined in the related art, the terminal may not receive content transmitted by the channel normally, which will lose a part of the transmission content of the PDCCH of the terminal or lose a part of the transmission content of the PDSCH.

Figure 2:
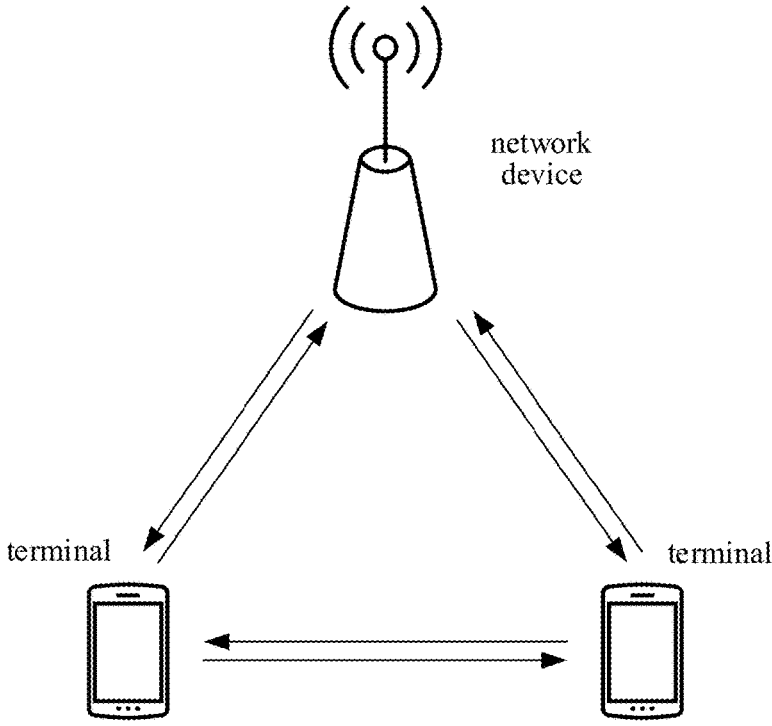
FIG. 2 is a diagram illustrating an architecture of a communication system including a network device and a terminal according to some embodiments.

For the problems existing in the related art, a method for configuring frequency hopping is provided in the present disclosure. In the method for configuring frequency hopping provided in the disclosure, the frequency band switching time points and the frequency band positions of different channels may be unified, and the transmission content lost by the terminal in the frequency-hopping process may be effectively avoided. FIG. 2 is a diagram illustrating an architecture of a communication system including a network device and a terminal according to some embodiments. The method for configuring frequency hopping in embodiments of the disclosure may be applied to the communication system architecture diagram as illustrated in FIG. 2. As illustrated in FIG. 2, the terminal receives transmission content sent by the network device on the PDCCH and the PDSCH of the terminal.

It may be understood that, the communication system including the network device and the terminal as illustrated in FIG. 2 is only a representative illustration, and the wireless communication system further may include other network devices, for example, a core network device, a wireless relay device, and a wireless backhaul device, which are not illustrated in FIG. 2. A number of network devices and a number of terminals included in the wireless communication system are not limited in embodiments of the disclosure.

It may be further understood that the wireless communication system in embodiments of the disclosure is a network that provides a wireless communication function. The wireless communication system may adopt different communication technologies, for example, code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. The networks may be divided into a second generation (2G) network, a third generation (3G) network, a fourth generation (4G) network, or a future evolution network such as a fifth generation (5G) network, based on capacities, rates, latencies, and other factors of different networks. For example, the 5G network may also be referred to as an NR network. For ease of description, the wireless communication network is simply referred to as the network in the disclosure sometimes.

Further, the network device involved in the disclosure may also be referred to as a wireless access network device. The wireless access network device may be a base station, an evolved node B, a home base station, an access point (AP) in a wireless fidelity (Wi-Fi) system, a wireless relay node, a wireless backhaul node, a transmission point (TP), a transmission and reception point (TRP), etc., or a gNB in an NR system, or may also be a component or a part of a device constituting a base station. The network device further may be a vehicle-mounted device in an Internet of Vehicles (V2X) communication system. It should be understood that, a specific technology and a specific device form adopted by the network device are not limited in the embodiments of the disclosure.

Further, the terminal involved in the disclosure further may be referred to as a terminal device, a user equipment (UE), a mobile station (MS), a mobile terminal (MT), etc., which is a device that provides voice and/or data connectivity to a user. For example, the terminal may be a handheld device, a vehicle-mounted device, or the like with a wireless connection function. At present, some terminals include, for example, a mobile phone, a pocket personal computer (PPC), a palm computer, a personal digital assistant (PDA), a notebook computer, a tablet computer, a wearable device, a vehicle-mounted device, or the like. In addition, the terminal device further may be a vehicle-mounted device in an Internet of Vehicles (V2X) communication system. It should be understood that, a specific technology and a specific device form adopted by the terminal are not limited in the embodiments of the disclosure.

Figure 3:
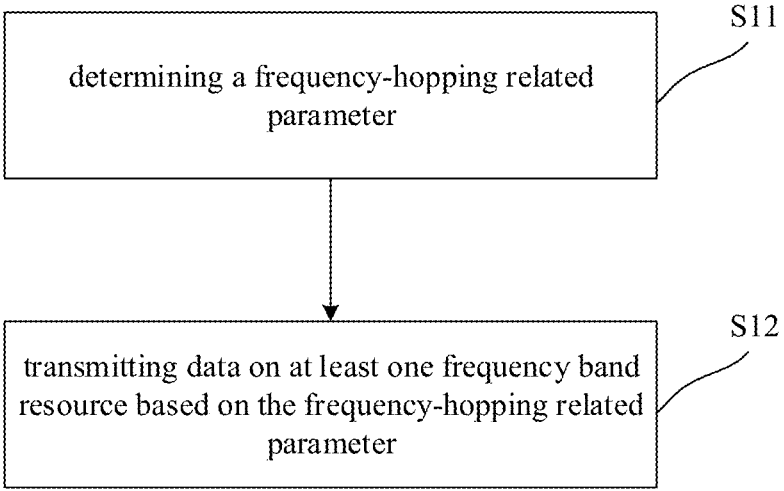
FIG. 3 is a flowchart illustrating a method for configuring frequency hopping according to some embodiments.

FIG. 3 is a flowchart illustrating a method for configuring frequency hopping according to some embodiments. As illustrated in FIG. 3, the method for configuring frequency hopping includes the following steps.

At step S11, a frequency-hopping related parameter is determined.

At step S12, data are transmitted on at least one frequency band resource based on the frequency-hopping related parameter.

In embodiments of the disclosure, for a same terminal, the frequency-hopping related parameter of the terminal is determined based on a capability and transmission of the terminal. The frequency-hopping related parameter may include a frequency band position of frequency hopping. Data are transmitted on the frequency band resource based on the determined frequency band position related parameter of frequency hopping.

In embodiments of the disclosure, data are transmitted on no less than two frequency band resources based on the frequency-hopping related parameter.

In embodiments of the disclosure, the frequency band positions of frequency hopping may be more than one, and belong to different frequency bands.

In embodiments of the disclosure, the frequency-hopping related parameter may further include any one or more parameters such as a bandwidth of a frequency band, a subcarrier spacing of a frequency band, and a related transmission parameter on a frequency band (such as a relative frequency domain position, a number of symbols occupied by transmission content, a duration, a channel mapping pattern, a transmission pattern, and the like).

In embodiments of the disclosure, when two or more different channels are transmitted in a same frequency band, frequency-hopping patterns of different transmission channels in the same frequency band are used to perform frequency hopping based on one of the following patterns.

At least two different transmission channels in the same downlink frequency band, are based on a same frequency-hopping parameter for the frequency hopping.

Or, at least two different transmission channels in the same frequency band, are based on a partially same frequency-hopping parameter for the frequency hopping.

In other words, frequency-hopping parameters of different transmission channels in the same frequency band are unified or partially unified, to achieve that more than one transmission channel has the same frequency band switching time point and the frequency band position.

In some embodiments of the disclosure, at least two different downlink transmission channels corresponding to the same frequency band of the same terminal, are based on the same frequency-hopping parameter in one frequency hopping for the frequency hopping. For example, when the same frequency-hopping parameter is determined in one frequency hopping for the PDCCH and the PDSCH, the frequency band switching time point and the frequency band position of frequency hopping on the PDCCH and the PDSCH may be same in the frequency-hopping process of the PDCCH and the PDSCH. Therefore, the terminal may receive transmission content of the PDCCH and the PDSCH at the same time, which avoids losing the transmission content of the transmission channel since different transmission channels correspond to different frequency band switching time points and frequency band positions.

For the same uplink channel of the same terminal (for example, a physical uplink control channel (PUCCH) and a physical uplink shared channel (PUSCH)), at least two different transmission channels correspondingly in the same uplink frequency band, are based on the same frequency frequency-hopping parameter in one frequency hopping for the frequency hopping. For example, when the same frequency-hopping parameter is determined in one frequency hopping for the PUCCH and the PUSCH, the frequency band switching time point and the frequency band position of frequency hopping on the PUCCH and the PUSCH may be same in the frequency-hopping process of the PUCCH and the PUSCH. Therefore, the terminal may send transmission content of the PUCCH and the PUSCH at the same time, which further avoids losing the transmission content of the transmission channel since different transmission channels correspond to different frequency band switching time points and frequency band positions.

In embodiments of the disclosure, other frequency-hopping parameters in addition to the switching time point and the frequency band position may be same or different, and corresponding configurations may be made based on different network states and protocols, which are not limited in the disclosure. In embodiments of the disclosure, the frequency-hopping related parameter includes at least one set of parameters. The set of parameters includes at least one of: a frequency band switching time related parameter, a frequency band position of a switched target frequency band, or a frequency-hopping time granularity.

That is, one set of parameters may include the frequency band switching time related parameter and the frequency band position of the switched target frequency band, or one set of parameters includes the frequency band position of the switched target frequency band and the frequency-hopping time granularity, or the one set of parameters includes the frequency band switching time related parameter, the frequency band position of the switched target frequency band, and the frequency-hopping time granularity, or the like. In other words, different set of parameters may include different frequency-hopping related parameters. In embodiments of the disclosure, target frequency band positions of frequency hopping may be more than one, and may belong to different frequency bands. All the target frequency bands have a same bandwidth and/or subcarrier spacing.

In embodiments of the disclosure, when a number of target frequency bands is more than one, that is, two or more, for a same transmission channel, a transmission parameter in more than one target frequency band is the same.

In embodiments of the disclosure, the transmission parameter includes at least one of: a frequency resource amount occupied by the transmission channel, a relative frequency domain position in the target frequency band, a transmission duration, a resource mapping pattern, or a transmission pattern. For example, the frequency domain position of the transmission resource of the PDSCH on an original frequency band is correspondingly same as the frequency domain position of the transmission resource on the target frequency band, that is, the frequency domain position of the transmission resource on the frequency band before frequency hopping is correspondingly same as the determined frequency domain position of the transmission resource on all the target frequency bands. And a number of symbols occupied by the transmission resource is same before and after frequency hopping. For example, the number of symbols occupied by the transmission resource before frequency hopping is 4, and the number of symbols occupied by the transmission resource on the target frequency band after hopped to the target frequency band is also 4. And as described above, the frequency domain position of four symbols occupied by the transmission resource on the target frequency band corresponds to the frequency domain position of the four symbols occupied by the transmission resource on the original frequency band.

For example, a configuration of a control-resource set (CORESET) on each frequency band for the PDCCH is also same. In other words, the relative frequency domain position, the duration, the mapping pattern of the PDCCH, and the transmission pattern configured for the frequency band of frequency hopping on the frequency band are same as a configuration of a same CORESET on the original frequency band.

In some embodiments of the disclosure, when the terminal receives a first indication message, a frequency hopping operation is performed according to a frequency-hopping pattern in the first indication message based on a predetermined number of frequency bands for frequency hopping of the terminal and a frequency band position. In the disclosure, a message for indicating the frequency-hopping pattern of the terminal is referred to as the first indication message for ease of description.

In embodiments of the disclosure, the frequency-hopping pattern may also be referred to as a frequency hopping sequence, and the first indication message may be determined based on a predefined manner (for example, a preset rule).

In embodiments of the disclosure, the frequency band position of the target frequency band for frequency hopping may be more than one, and may belong to different frequency bands. For example, based on the frequency band position of the target frequency band of frequency hopping, frequency hopping may be sequentially performed based on the frequency band position from a low frequency to a high frequency, and when the frequency band position with the highest frequency is reached, frequency hopping may be sequentially performed from the frequency band position with the highest frequency to the frequency band position with the lowest frequency, and finally the frequency band position with the lowest frequency is returned.

In another example, when there is more than one frequency band of frequency hopping, a frequency-hopping pattern may also be determined based on an indication signaling received by the terminal. In the signaling, the terminal may be instructed to perform frequency hopping based on a frequency hopping rule in the signaling. The frequency hopping rule in the signaling may be determined based on the actual situation.

In some embodiments of the disclosure, durations of receiving transmission content of different channels on each frequency band may be further determined or durations of sending transmission contents of different channels on each frequency band may be further determined, based on the number of frequency bands and the frequency band position that are predetermined. In other words, in embodiments of the disclosure, frequency-hopping time granularities of receiving transmission content of different channels on each frequency band are determined, or frequency-hopping time granularities of sending transmission content of different channels are determined. Durations of receiving transmission content of different channels on each frequency band, or durations of sending transmission content of different channels on each frequency band may be determined based on an absolute time. It needs to be understood that, the absolute time may be one or more of: a number of system subframes, a number of slots, a number of system symbols, or the like.

In embodiments of the disclosure, the terminal determines a frequency band switching time based on a received second indication message. In the disclosure, a message for indicating the frequency band switching time of the terminal is referred to as the second indication message. The second indication message includes a frequency switching period.

In embodiments of the disclosure, the terminal may determine the second indication message based on a broadcast message of a network side device, or may determine the second indication message based on a dedicated signaling of the network side device.

In embodiments of the disclosure, the frequency band switching time determined by the terminal based on the second indication message may also be determined based on the absolute time. As described above, the absolute time may include one or more of: a number of system subframes, a number of system slots, a number of system symbols, or the like. Therefore, the frequency band switching time of different frequency bands may determine a system subframe number, a system slot number, or a system symbol as the frequency band switching time based on the absolute time. In other words, the terminal determines based on the absolute time durations of receiving transmission content of different channels or durations of sending transmission content of different channels, and a frequency band switching time is determined based on the durations of receiving the transmission content of the different channels or the durations of sending the transmission content of the different channels. The frequency band switching time may be at least one of: the system subframe number, the system slot number, or the system symbol.

For example, when the absolute time where the terminal is located satisfies a predefined subframe equation, frequency band cutoff may be performed, that is, frequency band switching may be performed. The predefined subframe equation is (SFN+subframe) mod N=offset. It should be noted that, N is a switching time granularity or period, and is notified or predefined by a high-level signaling, and an offset value may be fixed in a predetermined manner, for example, offset=0 is fixed, or an offset value may further be configured based on a physical high layer, and SFN+subframe is an absolute time where the terminal is located, in which SFN is a system frame, subframe is a subframe within the system frame.

In some embodiments of the disclosure, the terminal receives a third indication message to determine to enable or disable a frequency-hopping function. In the disclosure, an indication message configured to determine to enable or disable the frequency hopping function is referred to as the third indication message.

In embodiments of the disclosure, when the third indication information received by the terminal is enabling the frequency-hopping function, the terminal further determines a relationship between a frequency band where current transmission content of different transmission channels is located and a frequency band of frequency hopping.

In an implementation, when the frequency band where the current transmission content of the different transmission channels is located belongs to the determined frequency band of frequency hopping, the terminal may perform frequency hopping based on the frequency-hopping pattern in the received first indication message with the frequency-hopping pattern on the basis of the frequency band where the current transmission content of the different transmission channels is located according to the received indication message indicating the frequency-hopping pattern, in response to the frequency band of frequency hopping including the frequency band where the current transmission content of the different transmission channels is located.

Alternatively, in another implementation, when the frequency band where the current transmission content of the different transmission channels is located does not belong to the determined frequency band of frequency hopping, the terminal may perform frequency hopping based on the frequency-hopping pattern in the received first indication message with the frequency-hopping pattern after determining that the frequency band where the current transmission content of the different transmission channels is located is hopped to the frequency band of frequency hopping according to the received third indication message and the predetermined frequency band of frequency hopping and the frequency hopping position, in response to the frequency band of frequency hopping not including the frequency band where the current transmission content of the different transmission channels is located. The frequency band where the current transmission content of the different transmission channels is located may select to be hopped to a frequency band with a lowest frequency in the frequency band of frequency hopping, and be hopped based on the frequency-hopping pattern in the received first indication message with the frequency-hopping pattern. Alternatively, the frequency band where the current transmission content of the different transmission channels is located may further select to be hopped to a frequency band with a highest frequency in the frequency band of frequency hopping, and be hopped based on the frequency-hopping pattern in the received first indication message with the frequency-hopping pattern. Alternatively, the frequency band where the current transmission content of the different transmission channels is located may select to be hopped to a preset frequency band of the first frequency hopping in the frequency band of frequency hopping, and be hopped based on the received frequency-hopping pattern in the first indication message with the frequency-hopping pattern.

In embodiments of the disclosure, when the third indication message received by the terminal is disabling the frequency hopping function, the terminal may disable the frequency hopping function based on the received third indication message, and the terminal may temporarily stop performing the frequency hopping operation.

Based on the same conception, an apparatus for configuring frequency hopping is further provided in embodiments of the disclosure.

It may be understood that, the apparatus for configuring frequency hopping provided in embodiments of the disclosure includes hardware structures and/or software modules that perform corresponding functions in order to achieve the above functions. In combination with modules and algorithm steps of examples described in embodiments of the disclosure, the embodiments of the disclosure may be implemented in the form of hardware or a combination of hardware and computer software. Whether a certain function is executed by hardware or computer software driving hardware depends on specific applications and design constraints of the technical solutions. Those skilled in the art may adopt different methods for each specific application to implement the described functions, but such implementation should not be considered as beyond the scope of the technical solutions in embodiments of the disclosure.

Figure 4:
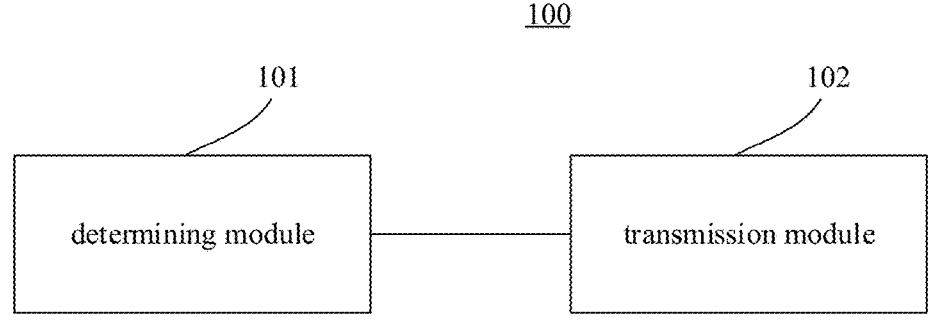
FIG. 4 is a block diagram illustrating an apparatus for configuring frequency hopping according to some embodiments.

FIG. 4 is a block diagram illustrating an apparatus 100 for configuring frequency hopping according to some embodiments. As illustrated in FIG. 4, the apparatus includes a determining module 101 and a transmission module 102.

The determining module 101 is configured to determine a frequency-hopping related parameter. The transmission module 102 is configured to transmit data on at least one frequency band resource based on the frequency-hopping related parameter.

In embodiments of the disclosure, the apparatus further includes: at least two different transmission channels in a same frequency band are based on a same or partially same frequency-hopping parameter.

In embodiments of the disclosure, at least two different transmission channels correspondingly in a same downlink frequency band, are based on a same frequency-hopping parameter in one frequency hopping. Alternatively, at least two different transmission channels correspondingly in a same uplink frequency band, are based on a same frequency-hopping parameter in one frequency hopping.

In embodiments of the disclosure, the frequency-hopping parameter includes at least one set of parameters. The set of parameters includes at least one of: a frequency band switching time related parameter, a frequency band position of a switched target frequency band, or a frequency-hopping time granularity.

In embodiments of the disclosure, a number of switched target frequency bands is greater than one, and all the target frequency bands have a same bandwidth and/or subcarrier spacing.

In embodiments of the disclosure, a same transmission channel corresponds to a same transmission parameter in different target frequency bands.

In embodiments of the disclosure, the transmission parameter includes at least one of: a frequency resource amount occupied by the transmission channel, a relative frequency position in the target frequency band, a transmission duration, a resource mapping pattern, or a transmission pattern.

Figure 5:
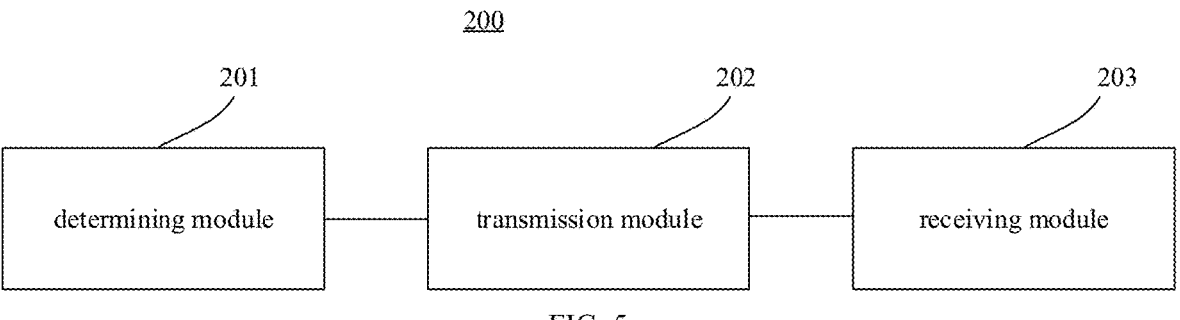
FIG. 5 is a block diagram illustrating an apparatus for configuring frequency hopping according to some embodiments.

FIG. 5 is a block diagram illustrating an apparatus 200 for configuring frequency hopping according to some embodiments. As illustrated in FIG. 5, the apparatus includes a determining module 201, a transmission module 202, and a receiving module 203.

The determining module 201 is configured to determine a frequency-hopping related parameter. The transmission module 202 is configured to transmit data on at least one frequency band resource based on the frequency-hopping related parameter.

In embodiments of the disclosure, the apparatus further includes: at least two different transmission channels in a same frequency band are based on a same or partially same frequency-hopping parameter.

In embodiments of the disclosure, at least two different transmission channels correspondingly in a same downlink frequency band, are based on a same frequency-hopping parameter in one frequency hopping. Alternatively, at least two different transmission channels correspondingly in a same uplink frequency band, are based on a same frequency-hopping parameter in one frequency hopping.

In embodiments of the disclosure, the frequency-hopping parameter includes at least one set of parameters. The set of parameters includes at least one of: a frequency band switching time related parameter, a frequency band position of a switched target frequency band, or a frequency-hopping time granularity.

In embodiments of the disclosure, a number of switched target frequency bands is greater than one, and all the target frequency bands have a same bandwidth and/or subcarrier spacing.

In embodiments of the disclosure, a same transmission channel corresponds to a same transmission parameter in different target frequency bands.

In embodiments of the disclosure, the transmission parameter includes at least one of: a frequency resource amount occupied by the transmission channel, a relative frequency position in the target frequency band, a transmission duration, a resource mapping pattern, or a transmission pattern.

The receiving module 203 is configured to receive a first indication message. The first indication message is configured to indicate a frequency-hopping pattern of a terminal.

In embodiments of the disclosure, the first indication message is predefined or determined based on a signaling.

In embodiments of the disclosure, the receiving module 203 is configured to receive a second indication message. The second indication message is configured to determine a frequency band switching time.

In embodiments of the disclosure, the second indication information includes a frequency switching period.

In embodiments of the disclosure, the frequency band switching time is determined based on at least one of: a system subframe number, a system slot number, or a system symbol.

In embodiments of the disclosure, the second indication message is determined based on a broadcast message or a dedicated signaling.

In embodiments of the disclosure, the receiving module 203 is configured to receive a third indication message. The third indication message is configured to determine to enable or disable a frequency-hopping function.

In embodiments of the disclosure, the receiving module is further configured to determine a relationship between a current frequency band and a frequency-hopping frequency band in response to the third indication information being enabling the frequency-hopping function.

In embodiments of the disclosure, when determining the relationship between the current frequency band and the frequency-hopping frequency band, the determining module, is further configured to: determine that frequency hopping is performed in a frequency-hopping pattern based on the current frequency band, in response to the frequency-hopping frequency including the current frequency band; or determine that frequency hopping is performed in a frequency-hopping pattern when the current frequency band is hopped to the frequency-hopping frequency band, in response to the frequency-hopping frequency band not including the current frequency band.

With regard to the apparatuses in the above embodiments, the specific manners for performing operations for individual modules therein have been described in detail in the embodiments regarding the methods for, which will not be elaborated herein.

Figure 6:
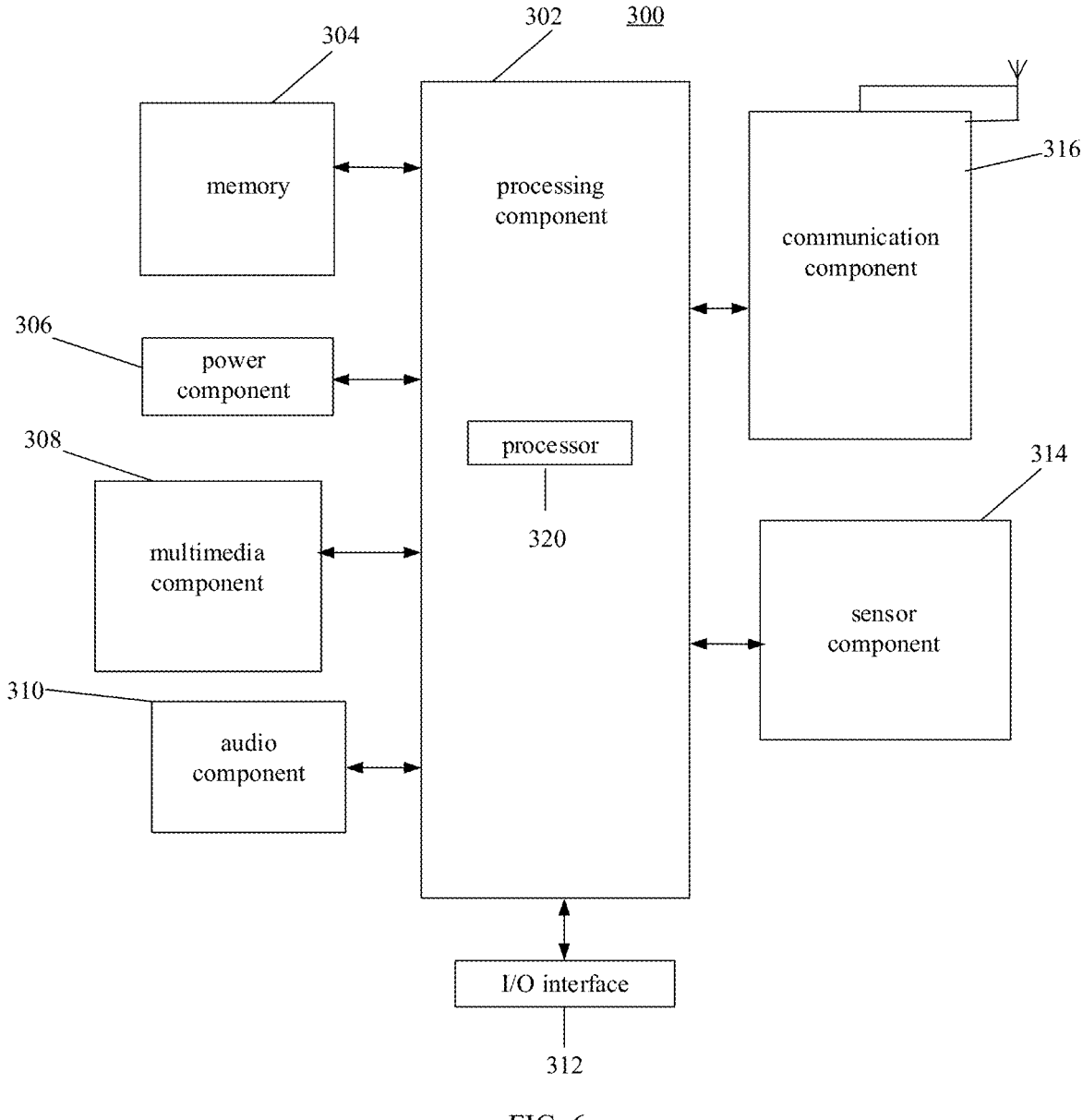
FIG. 6 is a block diagram illustrating a device for configuring frequency hopping according to some embodiments.

FIG. 6 is a block diagram illustrating a device 300 for configuring frequency hopping according to some embodiments. For example, the device 300 may be a mobile phone, a computer, a digital broadcast terminal, a messaging device, a gaming console, a tablet, a medical device, exercise equipment, a personal digital assistant, and the like.

Referring to FIG. 6, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 may include one or more processors 320 to execute instructions to perform all or part of the steps in the above described methods. Moreover, the processing component 302 may include one or more modules which facilitate the interaction between the processing component 302 and other components. For instance, the processing component 302 may include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and the rear camera may receive an external multimedia datum while the device 300 is in an operation mode, such as a photographing mode or a video mode. Each of the front camera and the rear camera may be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as Wi-Fi, 2G, or 3G, or a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 304, executable by the processor 320 in the device 300, for performing the above-described methods. For example, the non-transitory computer-readable storage medium may be a ROM, a RAM, a CD-ROM, a magnetic tape, a floppy disc, an optical data storage device, and the like.

The technical solutions provided in embodiments of the disclosure may include the following beneficial effects. The terminal determines the frequency-hopping related parameter, and transmits the data on the at least one frequency band resource based on the frequency-hopping related parameter. Further, the frequency band switching time point and the frequency band position of the frequency hopping on downlink physical channels or uplink physical channels may be unified in the disclosure, to avoid a signal loss caused by different frequency-hopping frequency band positions and frequency band switching of different transmission channels on the same frequency band.

It may be further understood that "more than one" in the disclosure means two or above, and other quantifiers are similar. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship. The singular forms "one", "the", and "this" are also intended to include a multiple form, unless other meanings are clearly represented in the context.

It should be further understood that, although the terms "first", "second", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this disclosure, first information may also be referred to as second information, and similarly, and second information may also be referred to as first information.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for configuring frequency hopping, comprising:

determining, based on a capability and transmission of a reduced capability user equipment, by the reduced capability user equipment, a frequency-hopping related parameter; and transmitting, by the reduced capability user equipment, data on at least two frequency band resources based on the frequency-hopping related parameter;

wherein at least two different transmission channels in a same frequency band are based on a same or partially same frequency-hopping related parameter;

wherein the frequency-hopping related parameter comprises a plurality of frequency band positions of frequency hopping, the plurality of frequency band positions belong to different frequency bands, wherein at least two different transmission channels correspondingly in a same downlink frequency band, are based on the same or partially same frequency-hopping related parameter in one frequency hopping, the at least two different transmission channels correspondingly in a same downlink frequency band comprise PDCCH and PDSCH; or at least two different transmission channels correspondingly in a same uplink frequency band, are based on the same or partially same frequency-hopping related parameter in one frequency hopping, at least two different transmission channels correspondingly in a same uplink frequency band, the at least two different transmission channels correspondingly in a same uplink frequency band comprise PUCCH and PUSCH;

wherein a frequency domain position of a transmission resource of the PDSCH on an original frequency band before frequency hopping is correspondingly same as a frequency domain position of a transmission resource of the PDSCH on a target frequency band after frequency hopping, and a number of symbols occupied by the transmission resource of the physical downlink shared channel is the same before and after frequency hopping.

2. The method as claimed in claim 1, wherein the frequency-hopping related parameter comprises at least one set of parameters, the set of parameters comprising at least one of:

a frequency band switching time related parameter, a frequency band position of a switched target frequency band, or a frequency-hopping time granularity.

3. The method as claimed in claim 2, wherein a number of switched target frequency bands is greater than one, and all the target frequency bands have a same bandwidth and/or subcarrier spacing.

4. The method as claimed in claim 2, wherein a same transmission channel corresponds to a same transmission parameter in different target frequency bands.

5. The method as claimed in claim 4, wherein the transmission parameter comprises at least one of:

a frequency resource amount occupied by the transmission channel, a relative frequency position in the target frequency band, a transmission duration, a resource mapping pattern, or a transmission pattern.

6. The method as claimed in claim 1, further comprising:

receiving, by the reduced capability user equipment, a first indication message, wherein the first indication message is configured to indicate a frequency-hopping pattern of the reduced capability user equipment.

7. The method as claimed in claim 6, wherein the first indication message is predefined or determined based on a signaling.

8. The method as claimed in claim 1, further comprising:

receiving, by the reduced capability user equipment, a second indication message, wherein the second indication message is configured to determine a frequency band switching time.

9. The method as claimed in claim 8, wherein the second indication message comprises a frequency switching period.

10. The method as claimed in claim 8, wherein the frequency band switching time is determined based on at least one of:

a system subframe number, a system slot number, or a system symbol.

11. The method as claimed in claim 8, wherein the second indication message is determined based on a broadcast message or a dedicated signaling.

12. The method as claimed in claim 1, further comprising:

receiving, by the reduced capability user equipment, a third indication message, wherein the third indication message is configured to determine to enable or disable a frequency-hopping function.

13. The method as claimed in claim 12, wherein a relationship between a current frequency band and a frequency-hopping frequency band is determined in response to the third indication message being enabling the frequency-hopping function.

14. The method as claimed in claim 13, wherein when determining the relationship between the current frequency band and the frequency-hopping frequency band, the method further comprises:

determining, by the reduced capability user equipment, that frequency hopping is performed in a frequency-hopping pattern based on the current frequency band, wherein the frequency-hopping frequency comprising the current frequency band; or determining, by the reduced capability user equipment, that frequency hopping is performed in a frequency-hopping pattern when the current frequency band is hopped to the frequency-hopping frequency band, wherein the frequency-hopping frequency band not comprising the current frequency band.

15. A reduced capability user equipment for configuring frequency hopping, comprising:

a processor; and a memory configured to store instructions executable by the processor;

wherein the processor is configured to execute the instructions to:

determine a frequency-hopping related parameter; and transmit data on at least one frequency band resource based on the frequency-hopping related parameter;

wherein at least two different transmission channels in a same frequency band are based on a same or partially same frequency-hopping related parameter;

wherein the frequency-hopping related parameter comprises a plurality of frequency band positions of frequency hopping, the plurality of frequency band positions belong to different frequency bands, wherein at least two different transmission channels correspondingly in a same downlink frequency band, are based on the same or partially same frequency-hopping related parameter in one frequency hopping, the at least two different transmission channels correspondingly in a same downlink frequency band comprise PDCCH and PDSCH; or at least two different transmission channels correspondingly in a same uplink frequency band, are based on the same or partially same frequency-hopping related parameter in one frequency hopping, at least two different transmission channels correspondingly in a same uplink frequency band, the at least two different transmission channels correspondingly in a same uplink frequency band comprise PUCCH and PUSCH;

wherein a frequency domain position of a transmission resource of the PDSCH on an original frequency band before frequency hopping is correspondingly same as a frequency domain position of a transmission resource of the PDSCH on a target frequency band after frequency hopping, and a number of symbols occupied by the transmission resource of the physical downlink shared channel is the same before and after frequency hopping.

16. A non-transitory computer readable storage medium having stored therein instructions that, when executed by a processor of a reduced capability user equipment, causes the reduced capability user equipment to:

determine a frequency-hopping related parameter; and transmit data on at least one frequency band resource based on the frequency-hopping related parameter;

wherein at least two different transmission channels in a same frequency band are based on a same or partially same frequency-hopping related parameter;

wherein the frequency-hopping related parameter comprises a plurality of frequency band positions of frequency hopping, the plurality of frequency band positions belong to different frequency bands, wherein at least two different transmission channels correspondingly in a same downlink frequency band, are based on the same or partially same frequency-hopping related parameter in one frequency hopping, the at least two different transmission channels correspondingly in a same downlink frequency band comprise PDCCH and PDSCH; or at least two different transmission channels correspondingly in a same uplink frequency band, are based on the same or partially same frequency-hopping related parameter in one frequency hopping, at least two different transmission channels correspondingly in a same uplink frequency band, the at least two different transmission channels correspondingly in a same uplink frequency band comprise PUCCH and PUSCH;

wherein a frequency domain position of a transmission resource of the PDSCH on an original frequency band before frequency hopping is correspondingly same as a frequency domain position of a transmission resource of the PDSCH on a target frequency band after frequency hopping, and a number of symbols occupied by the transmission resource of the physical downlink shared channel is the same before and after frequency hopping.

17. The reduced capability user equipment of claim 15, wherein, at least two different transmission channels correspondingly in a same downlink frequency band, are based on the same or partially same frequency-hopping related parameter in one frequency hopping; or at least two different transmission channels correspondingly in a same uplink frequency band, are based on the same or partially same frequency-hopping related parameter in one frequency hopping.

* * * * *